UNITED STATES PATENT OFFICE.

LEWIS CHEESEMAN, SR., OF ALEXANDRIA, VIRGINIA, ASSIGNOR OF TWO-THIRDS TO A. H. AGNEW AND PARK AGNEW, OF ALEXANDRIA, VIRGINIA.

METHOD OF MAKING WATER-SOLUBLE PHOSPHATES.

SPECIFICATION forming part of Letters Patent No. 690,049, dated December 31, 1901.

Application filed June 4, 1901. Serial No. 63,108. (No specimens.)

*To all whom it may concern:*

Be it known that I, LEWIS CHEESEMAN, Sr., a citizen of the United States, residing at Alexandria, in the county of Alexandria and State of Virginia, have invented new and useful Improvements in Processes or Methods of Treating Phosphates, of which the following is a specification.

The object of my invention is the provision of an improved process or method of treating naturally-occurring phosphates—such as hard and soft phosphate rock, apatites, coprolites, &c.—whereby the insoluble compounds thereof, as triphosphate of lime, shall be converted into forms soluble in water or ammonium citrate, thus making the phosphoric acid available as a fertilizer.

My invention consists in the process as hereinafter set forth and claimed.

The successive steps of the process or method of treatment are as follows: First, the naturally-occurring phosphate and the various substances and compounds associated with it, generally embracing carbonate of lime, carbonate of magnesium, and fluorid of lime, are reduced to a fine powder or comminuted in any well-known way, the treatment in any given case depending upon the form of the naturally-occurring phosphate. A crusher may be employed to break up the hard portions and thereafter the entire mass reduced to fine particles and screened, if desired, to render the product which is to be further treated substantially homogeneous.

Second, the fine particles or "flour" should be mixed in a suitable receptacle with water and a predetermined amount of sulfuric acid which will be sufficient to reduce the carbonates and fluorid. The reactions resulting from the addition of the sulfuric acid may be expressed as follows:

$$CaCO_3 + H_2SO_4 + H_2O = CaSO_4 + CO_2 + (H_2O)_2.$$

$$MgCO_3 + H_2SO_4 + H_2O = MgSO_4 + CO_2 + (H_2O)_2.$$

$$CaFl_2 + H_2SO_4 + H_2O = CaSO_4 + (HFl)_2 + H_2O.$$

Third, there is added to the mixture acid sulfate of soda, (niter-cake,) the quantity depending upon the quantity of phosphate of lime to be converted, and the following reactions result:

$$(NaHSO_4)_2 + H_2O = Na_2SO_4 + H_2SO_4 + H_2O.$$

$$(Ca_3(PO_4)_2)_2 + (H_2SO_4)_3) + H_2O = Ca_2H_2(PO_4)_2 + 3CaSO_4 + H_2O.$$

Fourth, the water is evaporated from the liquid mixture in any well-known way, and the residuum, which contains monobasic and dibasic phosphate, is available as a fertilizer.

Having described my invention, what I claim as new, and desire to secure by Letters Patent, is—

The process or method of treating naturally-occurring phosphate, consisting in comminuting the naturally-occurring phosphate and the compounds associated therewith; mixing the same with water and sufficient sulfuric acid only to convert the carbonates and fluorid present in the mixture; adding to the solution acid sulfate of soda; and evaporating the water from the solution.

In testimony whereof I affix my signature in presence of two witnesses.

LEWIS CHEESEMAN, SR.

Witnesses:
A. H. AGNEW,
JOHN D. NORMOYLE.